(12) United States Patent
Hall

(10) Patent No.: US 6,558,558 B1
(45) Date of Patent: May 6, 2003

(54) APPARATUS FOR CIRCULATING A FLUID

(76) Inventor: Alethea Rosalind Melanie Hall, Plot 40, Dawn Farm, Driefontein, 1747, Muldersdrift (ZA)

( * ) Notice: Subject to any disclaimer, the term of this patent is extended or adjusted under 35 U.S.C. 154(b) by 0 days.

(21) Appl. No.: 09/762,421
(22) PCT Filed: Aug. 6, 1999
(86) PCT No.: PCT/IB99/01396
 § 371 (c)(1),
 (2), (4) Date: Mar. 28, 2001
(87) PCT Pub. No.: WO00/07689
 PCT Pub. Date: Feb. 17, 2000

(30) Foreign Application Priority Data

Aug. 7, 1998 (ZA) .............................................. 98/7133

(51) Int. Cl.[7] .............................................. B01D 21/00
(52) U.S. Cl. ..................... 210/802; 210/521; 210/221.1
(58) Field of Search ................................. 210/521, 522, 210/220, 221.1, 252, 801, 802, 806

(56) References Cited

U.S. PATENT DOCUMENTS

| 367,308 A | 7/1887 | MacNab, Sr. |
| 2,613,811 A | 10/1952 | Archibald |
| 5,458,770 A | 10/1995 | Fentz |

FOREIGN PATENT DOCUMENTS

| DE | 4041241 | 7/1992 |
| DE | 4313902 | 11/1994 |
| DE | 4329239 | 3/1995 |
| DE | 19630831 | 2/1998 |
| EP | 0423964 | 4/1991 |
| EP | 0531148 | 3/1993 |
| EP | 0826637 | 3/1998 |
| GB | 2023381 | 1/1980 |
| GB | 2225779 | 6/1990 |

*Primary Examiner*—Robert J. Popovics
(74) *Attorney, Agent, or Firm*—Ladas & Parry

(57) ABSTRACT

Apparatus for circulating a fluid, for example a liquid or a gas, from a first end to a second end is disclosed. The apparatus comprises: a tube of a flexible material divided by dividing walls of a flexible material into an array of compartments or cells running the length of the tube, the compartments being arranged in rows and columns so that the tube divided by dividing walls has a honeycomb structure, with a first end of the tube on a base and a second end of the tube above the first end of the tube; first flow means and second flow means a fluid inlet into the first row of compartments; and a fluid outlet from the last row of compartments; so that fluid introduced through the fluid inlet flows either up or down the compartments in the first row, through the first or second flow means between the first and second rows, and then down or up the compartments in the second row, through the second or first flow means between the second and third rows, and so on until the fluid reaches the fluid outlet. The apparatus may be used for the treatment of waste water.

22 Claims, 5 Drawing Sheets

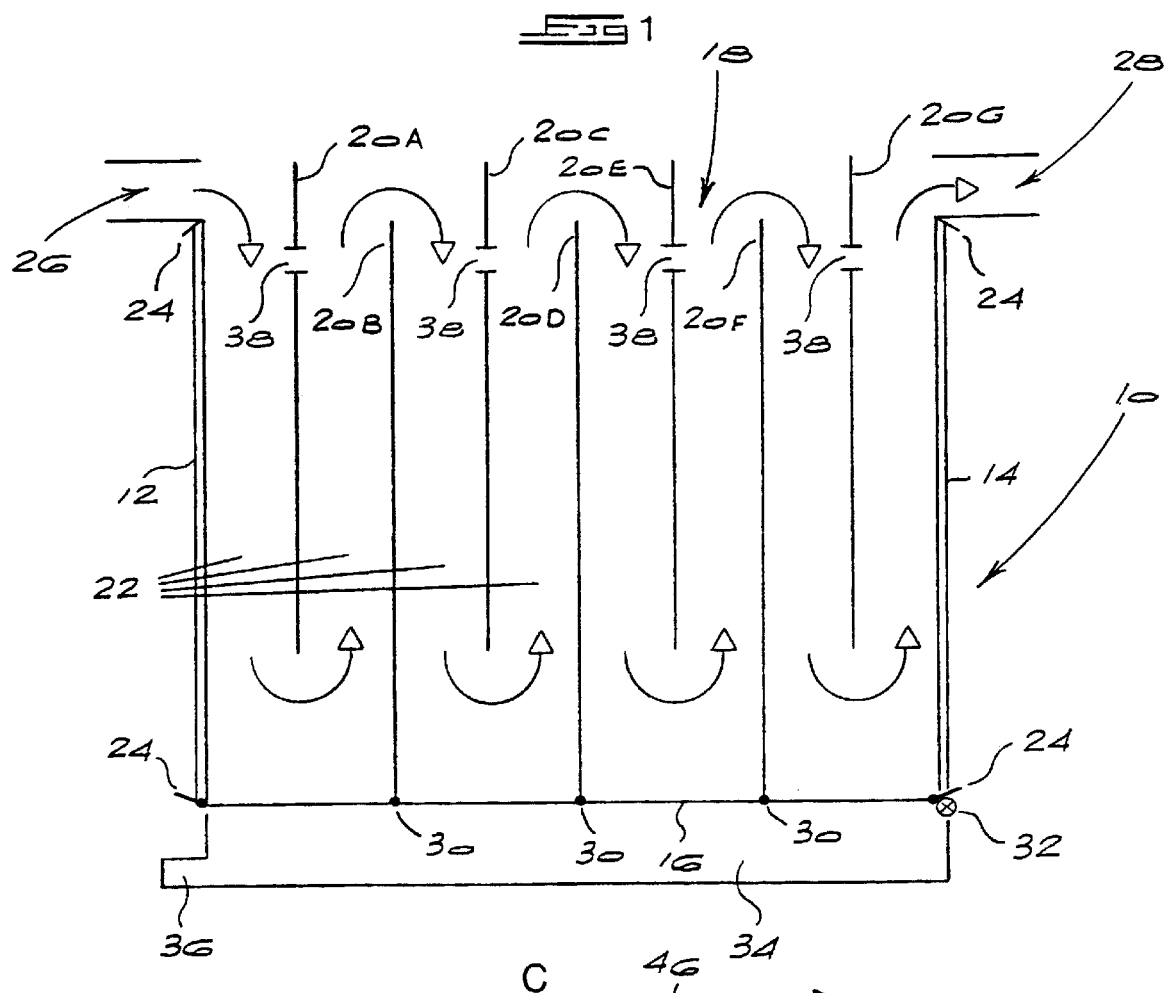
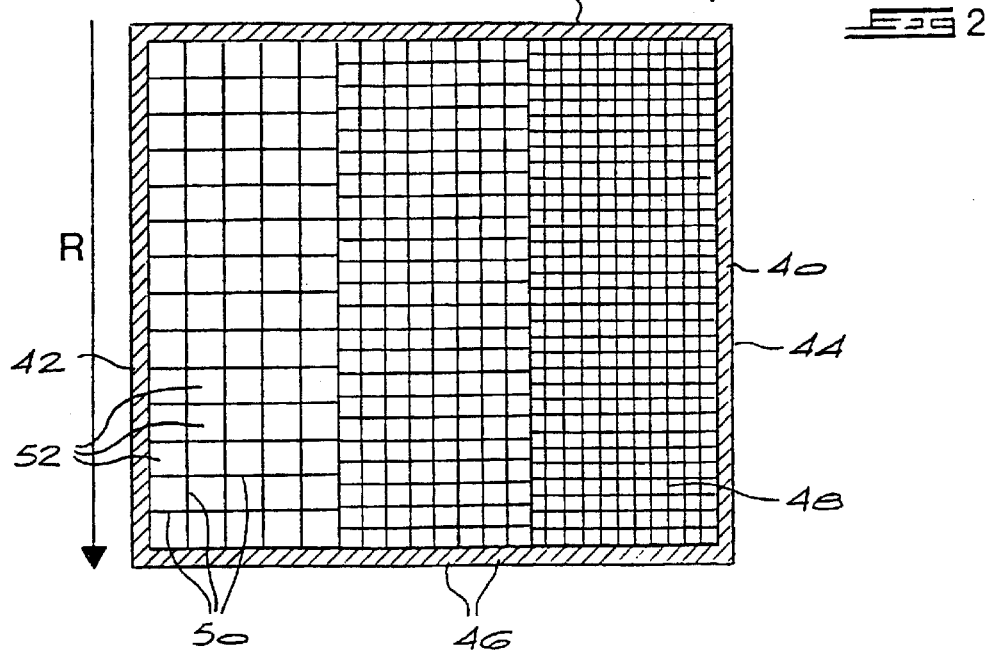

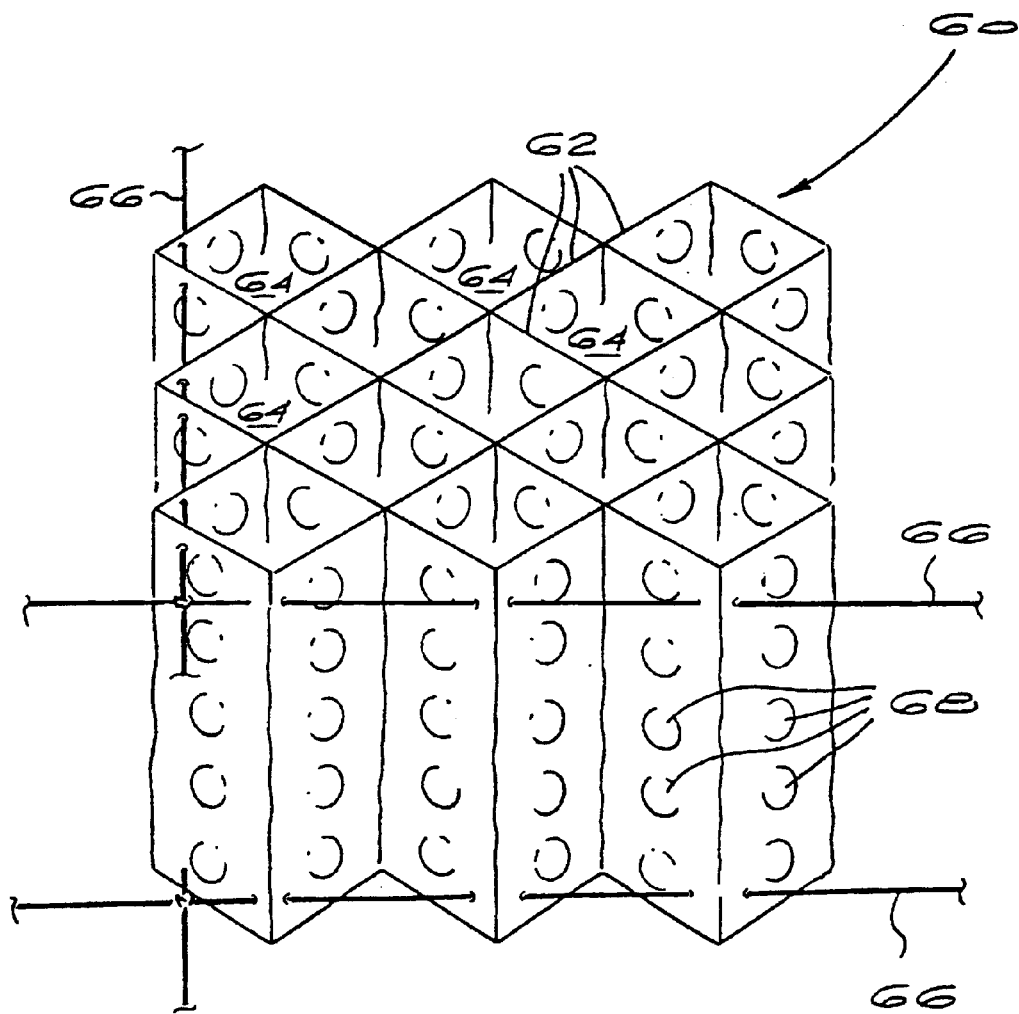

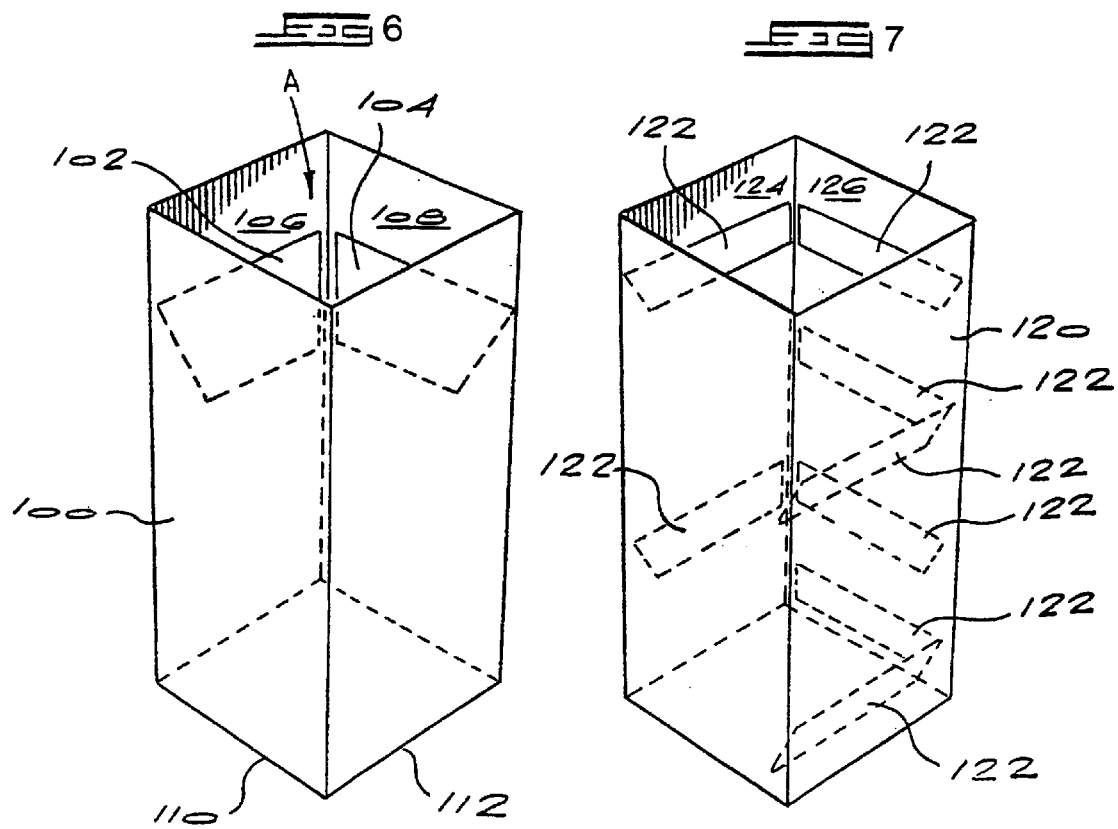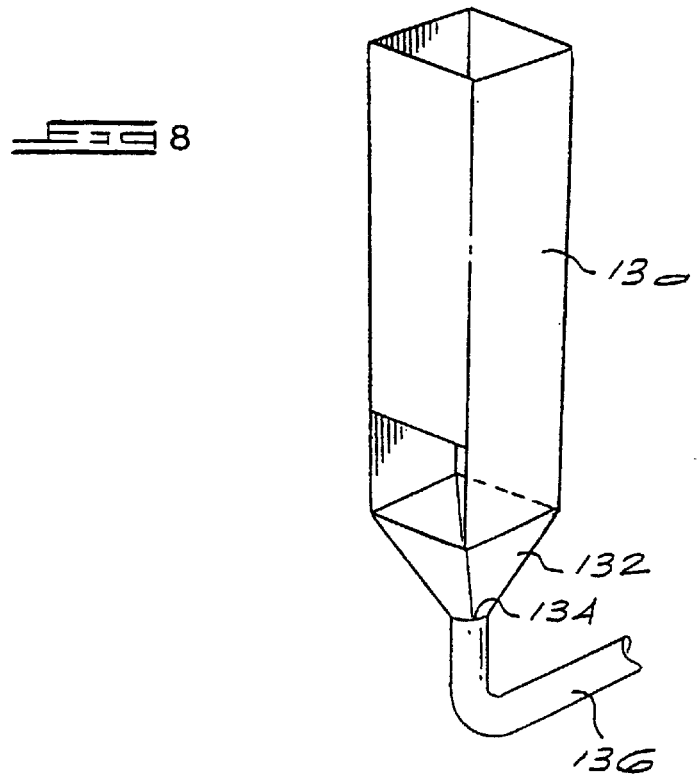

APPARATUS FOR CIRCULATING A FLUID

BACKGROUND TO THE INVENTION

THIS invention relates to apparatus for circulating a fluid from a first end to a second end of the apparatus, for example for filtration of the fluid, for separation of solids by gravity separation, for mixing, for mineral flotation separation and the like, and to methods of use of the apparatus.

It is well known to form support structures such as roadways, canals or river or bank linings and the like from a material having a honeycomb structure, i.e., having a plurality of compartments or cells divided by dividing walls, each compartment or cell being filled with a suitable filler material. However, there is always a need for new methods of utilising this tube material.

SUMMARY OF THE INVENTION

According to the invention there is provided apparatus for circulating a fluid, i.e a liquid or a gas, from a first end to a second end, the apparatus comprising:

(1) a tube of a flexible material divided by dividing walls of a flexible material into an array of compartments or cells running the length of the tube, the compartments being arranged in rows and columns so that the tube divided by dividing walls has a honeycomb structure, with a first end of the tube on a base and a second end of the tube above the first end of the tube;

(2) first flow means at or near the first end of the tube, and either in the dividing walls between the first and second rows and between the third and fourth rows and between each succeeding pairs of rows, or in the dividing walls between the second and third rows and between the fourth and fifth rows and between each succeeding pairs of rows;

(3) second flow means at or near the second end of the tube, and either in the dividing walls between the second and third rows and between the fourth and fifth rows and between each succeeding pairs of rows, or in the dividing walls between the first and second rows and between the third and fourth rows and between each succeeding pairs of rows, so that the first flow means and the second flow means alternate;

(4) support means for supporting the tube in position on the base;

(5) a fluid inlet into the first row of compartments; and (6) a fluid outlet from the last row of compartments;

so that fluid introduced through the fluid inlet flows either up or down the compartments in the first row, through the first or second flow means between the first and second rows, and then down or up the compartments in the second row, through the second or first flow means between the second and third rows, and so on until the fluid reaches the fluid outlet.

Clearly, when the first flow means are located in the dividing walls between the first and second rows and between the third and fourth rows and between each succeeding pairs of rows, then the second flow means are located in the dividing walls between the second and third rows and between the fourth and fifth rows and between each succeeding pairs of rows, and when the first flow means are located in the dividing walls between the second and third rows and between the fourth and fifth rows and between each succeeding pairs of rows, then the second flow means are located in the dividing walls between the first and second rows and between the third and fourth rows and between each succeeding pairs of rows. In other words, the first flow means and the second flow means alternate.

In a first embodiment of the invention, the first flow means may be provided by spacing the dividing walls between a pair of rows from the base (with the dividing walls of adjacent rows touching the base), and the second flow means may be provided by extending the dividing walls between a pair of rows above the dividing walls of adjacent rows. Thus, in this embodiment of the invention, a dividing wall between a first and a second row is spaced from the base and extends above the dividing walls of adjacent rows, the dividing wall between a second and a third row of compartments touches the base and is lower than the dividing walls of adjacent rows, the dividing wall between a third and a fourth row of compartments is spaced from the base and extends above the dividing walls of adjacent rows, and so on.

In a second embodiment of the invention, each first flow means comprises an aperture in a dividing wall between a pair of rows and likewise each second flow means comprises an aperture in a dividing wall between a pair of rows. Generally, such apertures will be provided in each of the compartments in each of the rows. Thus, in this embodiment, a series of apertures are located at or near the first end of the tube in a first row of compartments, a series of apertures are located at or near the second end of the tube in a second row of compartments adjacent the first row, a series of apertures are located at or near the first end of the tube in a third row of compartments adjacent the second row, a series of apertures are located at or near the second end of the tube in a fourth row of compartments adjacent the third row, and so on.

The support means for supporting the tube in position on the base may be for example a container defined by one or more side walls and the base, into which the tube is located and secured. The tube may be secured in the container in any suitable manner, for example by attaching the corners of the tube to the corners of the container.

Alternatively, the support means may comprise a series of flexible strings or rigid stays located through suitable rows and columns of compartments, generally at or near the edges of the tube, which flexible strings or rigid stays are attached to fixed objects to support the tube with the first end of the tube on the base and the second end of the tube above the first end.

Thus, for example, when the tube is substantially rectangular in plan view, a string or a stay may be located in at least a row or a column of compartments at or near each of the four edges of the tube.

The use of flexible strings or rigid stays to support a tube in position is described in more detail in co-pending application PCT/IB99/00965.

Further alternatively the outer walls of the tube may be made sufficiently rigid so that the tube is self supporting.

The cross-sectional size of the compartments may reduce or increase in size from the compartments of the first row of compartments to the compartments of the last row of compartments. For example, the compartments may be of three different sizes, with the cross-sectional size of the compartments in the first row and in one or more rows adjacent the first row being greater than the cross-sectional size of the compartments of one or more rows intermediate the first and last rows of compartments, which in turn have a greater cross-sectional size than the cross-sectional size of the compartments in the last row and in one or more rows adjacent the last row of compartments.

The use of compartments with different cross-sectional sizes is described in more detail in co-pending application PCT/IB99/00967.

One or more of the compartments may include a baffle or baffles to direct the flow of the fluid through the compartment concerned. For example, where the flow of fluid enters a compartment at a leading wall of that compartment, the leading wall may have attached thereto one or more baffles to direct the flow of fluid onto the opposite wall or walls of the compartment. As another example, all of the walls of the compartment may have attached thereto one or more baffles so as to create a mixing of the fluid flowing through the compartment in that compartment.

The baffle or baffles may be attached to the walls of the compartments or may form an insert to be inserted into the compartments.

The base of the apparatus may be located above a space, the space having an outlet, the base being adapted to being moved to allow any material in the compartments of the tube to move into the space from where the material may be removed via the outlet. This provides for easy cleaning of the apparatus of the invention.

The base of the apparatus may also comprise or include, in each compartment, a funnel shaped insert, which may either be attached to the compartment or be an insert in the compartment, each funnel shaped insert having a central hole through which material may be removed or through which a fluid may be forced into the compartment concerned.

The tube may also be adapted to be lifted off the base to allow for removal of material on the base.

The tube and the dividing walls may be made from any suitable flexible material. Although the material must possess some degree of flexibility, the degree of flexibility may range from very flexible up to semi-rigid. The flexible material may be for example a plastics material such as for example a co-extruded or a bi-axially extruded plastics material; a plastics mesh material; a plastics laminate material such as for example a laminate of a plastics material and a metallic material or a textile material; a metallic material; a woven or non-woven textile material; a paper or cardboard material; and the like.

The flexible material is preferably a suitable plastics material.

The tube may have any suitable height and any suitable compartment size. For example, the height of the tube may range from 100 mm to 10 m and each compartment may have a wall length of from 5 mm up to 2 m.

The tube may be shaped, e.g by cutting the compartments in one or more rows or columns at an angle, to fit into a desired space, e.g the interior of a tank or the like or to allow overflow from the apparatus when it is used as a trickle bed filter.

The compartments in the tube may have any suitable cross-section, such as triangular, square, hexagonal or octagonal, but preferably have a square cross-section, i.e each compartment is defined by four walls of substantially equal length.

One or more of the compartments may be filled with a suitable filler material such as for example ceramic Raschig rings, marbles, glass beads, sand, copper or stainless scrubbing pads and the like. Such fillers may be selected according to the intended use of the apparatus of the invention.

The fluid inlet into the first row of compartments may be located in any suitable position in the compartments, generally at or near the second end of the tube or at or near the first end of the tube. Likewise the fluid outlet from the last row of compartments may be located in any suitable position in the compartments, generally at or near the first end of the tube, or at or near the second end of the tube.

The apparatus may include one or more additional inlets into specific compartments or into specific rows or columns of compartments, for the introduction of a gas, liquid or solid, or to allow heat exchange to take place, while the fluid is circulating through the apparatus.

The apparatus of the invention has many uses.

The apparatus of the invention may be used for the treatment of a liquid containing suspended solids to remove the solids therefrom and/or to separate the solids into fractions according to their densities. In this case the solids settle at the bottoms of the containers on the base, while the liquid moves forward and ultimately out of the fluid outlet. This treatment may be sewage treatment, water treatment, mines slimes treatment, brewing waste treatment, animal manure treatment or the like.

In the case of water purification treatment, the compartments in one or more of the rows, particularly the rows at or close to the last row of compartments, may include a filtration medium such as charcoal or diatomaceous earth or the like, or a filtration insert such as plastic net rolled into a roll to increase the surface area available in the compartments, or may include a material which changes the composition of the water, e.g limestone, or steel wool, to assist in the water treatment.

This system of water treatment may also be used to separate oil from water, for example to remove an oil slick from the sea.

The apparatus of the invention may also be used for the chemical mixing of a particular liquid or gas or solid chemical or chemicals into a bulk liquid. In this case, the bulk liquid is circulated from the fluid inlet through the apparatus, with the liquid or gas or solid chemical or chemicals being introduced into compartments in one or more of the rows, with the final mixture being removed through the fluid outlet. The apparatus of the invention provides for good mixing of the various components, particularly when the compartments include suitable baffles to promote mixing.

The apparatus of the invention may also be used as a methane digester.

The apparatus of the invention may also be used in agriculture and as a fish hatchery, with fish spawn or small fish being kept in the compartments with a constant flow of running water over them, the water containing the nutrients necessary for growth. Every alternate row of compartments may be filled with a suitable feed material, with the fish spawn or small fish having access to the feed material through small apertures in the walls defining the compartments, so as to protect the feed material from pollution.

The production of full grown aquaculture life may be increased by the high flow rate of the apparatus of the invention, the introduction of oxygen at certain stages, and the removal of waste products without affecting the flow of the water and life of the tank. The apparatus also allows for the removal of the live product in stages without interfering with the adjacent compartments.

The apparatus of the invention may also be used in many other applications such as for example swimming pool filters; the cleaning of polluted rivers; in chemical process plants; in froth flotation mineral separation; to remove ash from smoke stack effluent with the removal of sulphur and other chemicals; in bio-leaching using bacteria to remove minerals from ore bodies; in chemical leaching of minerals from ore bodies; in an irrigation system to remove seeds and sand from irrigation water and to mix in fertilizers and chemicals into the irrigation water in one apparatus; and the like.

BRIEF DESCRIPTION OF THE DRAWINGS

FIG. 1 is a schematic sectioned side view of a first apparatus of the invention;

FIG. 2 is a schematic plan view of a second apparatus according to the invention;

FIG. 3 is a schematic perspective view of a tube and support means for use in the apparatus of the invention;

FIGS. 6 and 7 are schematic views of single compartments of the apparatus for the invention including baffles; and FIG. 8 is a schematic view of a single compartment of the apparatus of the invention including a funnel-shaped insert for removal of material from the compartment.

DESCRIPTION OF EMBODIMENTS

Figure 4:
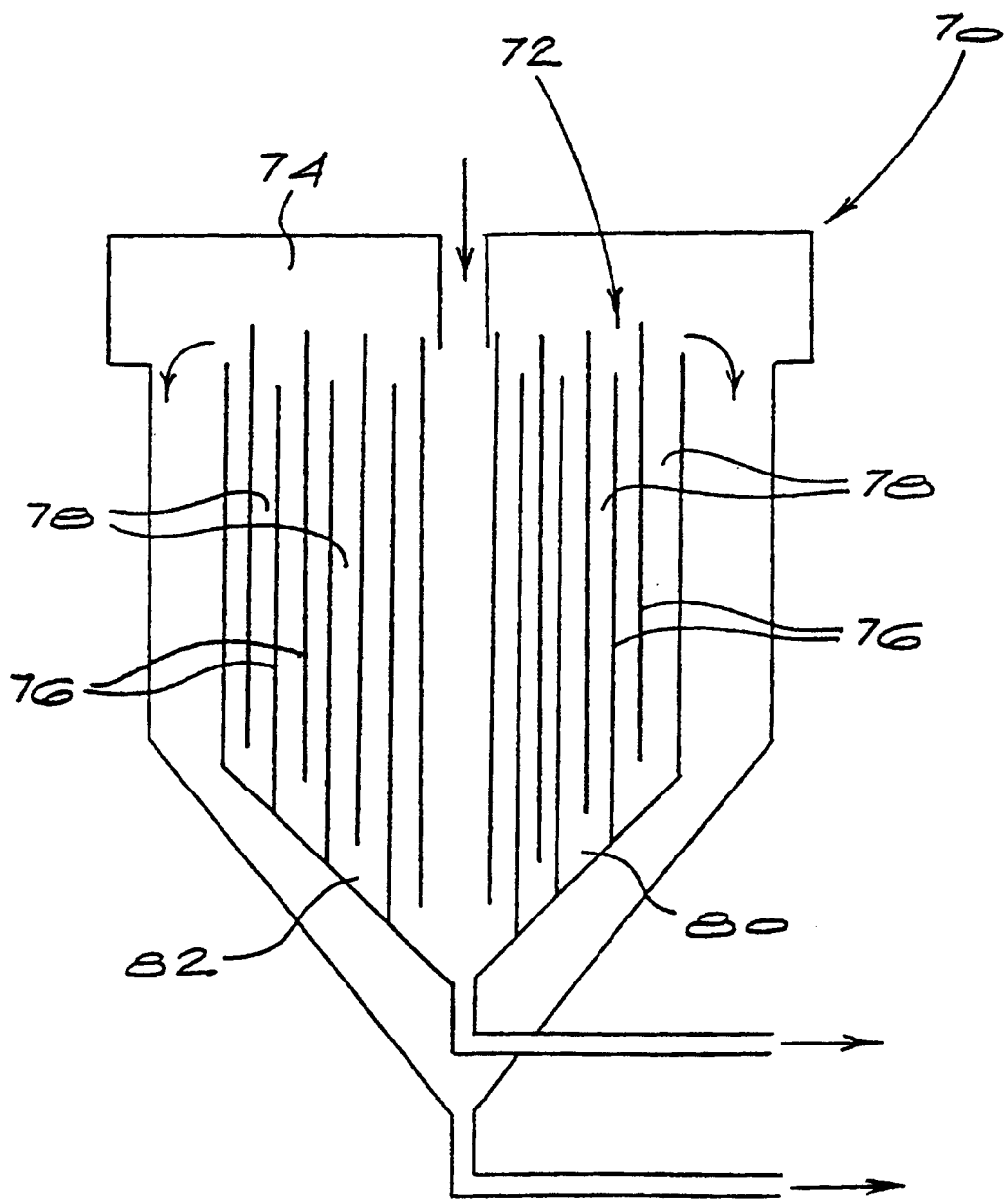
FIG. 4 is a schematic side view of a tank containing a tube according to the invention.

The crux of the invention is apparatus for circulating a fluid such as a liquid or a gas from a first end to a second end of a tube.

Referring to FIG. 1, the apparatus comprises a container or tank 10 having a front wall 12, a rear wall 14, side walls (not shown) and a base 16. A tube 18 is located and supported in the container 10.

The tube 18 is made of a flexible material and is divided by dividing walls 20 of a flexible material into an array of compartments 22 running the length of the tube 18. The compartments 22 are arranged in rows running in the direction of the arrow R (in FIG. 2) and columns running in the direction of the arrow C (in FIG. 2), so that the tube 18 divided by dividing walls 20 has a honeycomb structure.

The tube 18 is secured in the container 10 at positions 24 as illustrated. The apparatus include a fluid inlet 26 at a top edge of the front wall 12 of the container 10 and a fluid outlet 28 at a top edge of the rear wall 14 of the container 10.

It can be seen that the dividing wall 20A between the first and second rows of compartments 22 and likewise the dividing walls 20C, 20E and 20G between the third and fourth rows of compartments 22 and the 5th and 6th rows of compartments 22 and the 7th and 8th rows of compartments 22, are each spaced from the base 16. These walls 20A, 20C, 20E and 20G also extend above the dividing walls 20B, 20D and 20F as illustrated. Further, the dividing walls 20B, 20D and 20F are attached at positions 30 to the base 16.

The base 16 is hingedly attached at 32 to the container 10 so that it may be moved and dropped into a space 34 which includes an outlet 36.

The dividing walls 20 include holes 38 for the removal of a top floating layer. In addition, one or more pipes or the like may run through a row or rows of compartments 22 for the introduction of a gas or a liquid.

The use of the apparatus of FIG. 1 for the treatment of water to purify the water will now be described.

Untreated water is introduced via the fluid inlet 26 into the compartments 22 in the first row of the tube 18 in the container 10 as illustrated by an arrow. The water passes down the compartments 22 in the first row, under the dividing wall 20A, up the compartments 22 in the second row, over the dividing wall 20B, and so on until it exits the container at the fluid outlet 28. Suspended solids in the water introduced at the fluid inlet 26, are trapped at the bottoms of the compartments 22, while the water, which gets purer through each series of rows of compartments 22, finally exits, as substantially pure water, at the fluid outlet 28.

The design of the apparatus of the invention is such that there is no back flow through the apparatus, and no energy is required to circulate the water from the fluid inlet 26 to the fluid outlet 28.

When the compartments 22 become silted up, the base 16 may be dropped about its hinge 32 so that the solids in the compartments 22 drop into the space 34, from which they can be removed through the outlet 36. This provides for easy cleaning of the apparatus of the invention.

When the apparatus of the invention is to be used for water treatment or the like, the compartments 22 in the rows adjacent the rear wall 14 of the container 10 may include a filtration medium such as charcoal or diatomaceous earth to assist in filtration.

Referring to FIG. 2, there is shown a second apparatus of the invention which again comprises a container 40 having a front wall 42, a rear wall 44 and two side walls 46. A tube 48 is located and secured in the container 40.

Again, the tube 48 is divided by dividing walls 50 into a plurality of compartments 52. In this case, the compartments 52 in a first number of rows have a greater cross-sectional size than the compartments 52 in a second number of rows, which in turn have a greater cross-sectional size than the compartments 52 in a third number of rows. This type of design is useful in the treatment of a liquid containing suspended solids, as the compartments 52 in the first number of rows of the tube 48 tend to fill up with the solids more quickly than the compartments 52 in the second number of rows, and than the compartments 52 in the third number of rows. In this case, the compartments 52 are provided in a square grid arrangement. Alternatively, the compartments 52 may be arranged through 45° C. to provide a diamond grid arrangement.

Although FIGS. 1 and 2 illustrate apparatus of the invention for use in the treatment of water, the apparatus of the invention may be used for many other purposes including chemical mixing, as a methane digester, and as a fish hatchery.

Referring to FIG. 3 there is shown a tube 60 divided by dividing walls 62 into a plurality of compartments 64. The tube 60 is supported in position by means of flexible strings 66 running through rows and columns of compartments 64, which strings 66 may be attached to suitable fixed objects to secure the tube 60 in position on a base.

The walls 62 of the compartments 64 of the tube 60 include formations 68 which break up the smoothness of the walls 62 of the compartments 64 which is advantageous in certain applications of the apparatus of the invention, such as for example when a microorganism is being cultivated in the apparatus of the invention.

Referring to FIG. 4 there is shown a tank 70 in which is inserted two separate tubes 72, 74, each divided by dividing walls 76 into a plurality of compartments 78 running the length of the tube 72, 74. Alternatively, it may be a single tube divided by dividing walls into a plurality of compartments in which the central compartment or compartments are larger in diameter than the surrounding compartments.

It can be seen that the first ends 80, 82 of the tubes 72, 74 have been cut at an angle to accommodate the interior shape of the tank 70.

Figure 5:
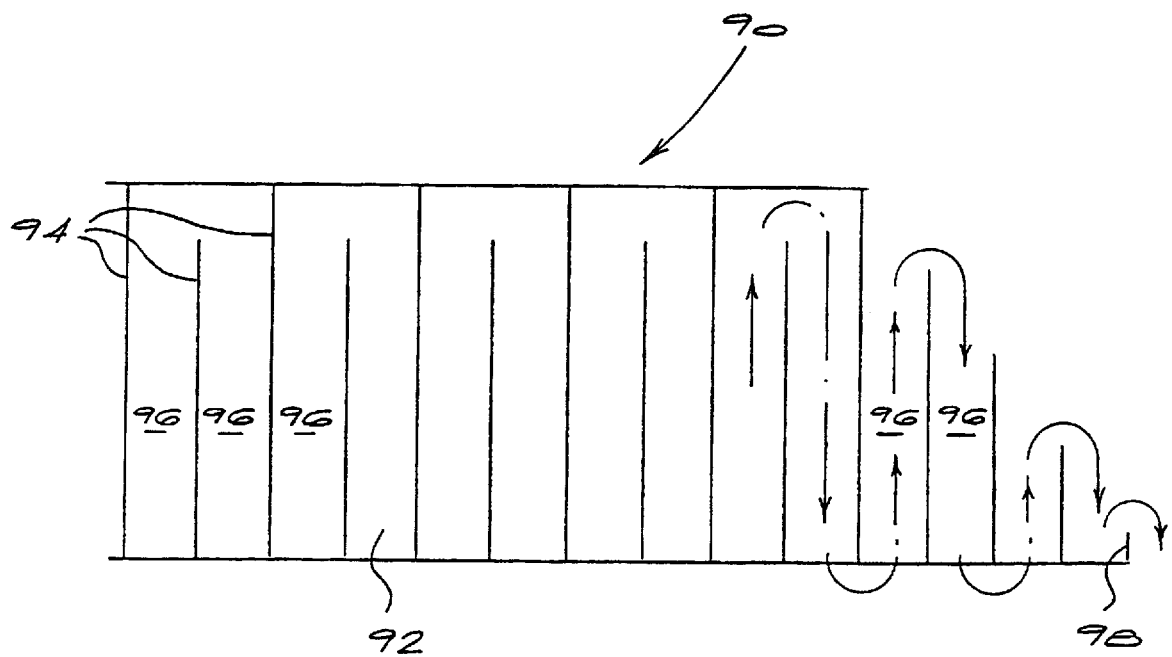
FIG. 5 is a schematic side view of a further apparatus according to the invention.

Referring to FIG. 5 there is shown apparatus 90 comprising a tube 92 divided by dividing walls 94 into a plurality of compartments 96 running the length of the tube 92. Here, the last four rows of compartments 96 have been cut at an angle, so that a fluid passing through the apparatus 90 exits the apparatus 90 over the last dividing wall 98 of the tube 92. This is useful when the apparatus is intended to be used as a trickle bed filter.

Referring to FIG. 6 there is shown a compartment 100 of an apparatus of the invention, which compartment 100 includes two baffles 102, 104, attached to the interior walls 106, 108 of the compartment 100. The baffles 102, 104 are designed such that when a fluid enters the compartment 100 in the direction of the arrow A, the fluid is directed towards the opposite walls 110, 112 of the compartment 100. This is a desirable effect in certain uses of the apparatus of the invention.

Referring to FIG. 7 there is shown a compartment 120 of an apparatus of the invention, which includes a plurality of baffles 122 attached to the interior walls 124, 126 of the compartment 120. These baffles 122 are designed to ensure thorough mixing of any fluid entering the compartment 120.

Referring to FIG. 8 there is shown a compartment 130 of an apparatus according to the invention which includes at its lower end a funnel shaped insert 132 which includes a central opening 134 to which may be connected a pipe 136. In use, any solid material collecting in the compartment 130 falls downwards and into the funnel shaped insert 132 from where it may be removed through the hole 134 and pipe 136. In another use, the pipe 136 and hole 134 may be used to force a liquid or a gas or the like into the compartment 130 to assist in whatever process is taking place in the apparatus of the invention. In an apparatus of the invention consisting of a plurality of compartments, the compartments may each be provided with an insert. Alternatively, a manifold arrangement consisting of a plurality of integral inserts may be used.

The apparatus of the invention has several advantages. Firstly, the apparatus is simple to install, operate and maintain. Secondly, once the apparatus is installed and operating, it requires very little attention and has no moving parts which can wear out. Thirdly, the apparatus of the invention requires no energy to run it, which obviously leads to economic advantages. Fourthly, in the various methods of use of the apparatus to the invention, in general more material can be treated than with conventional types of apparatus, at lower cost and with less addition of chemicals and the like. Finally, the apparatus may be widely varied in size to suit each user's individual needs.

What is claimed is:

1. Apparatus for circulating a fluid from a first end to a second end, the apparatus comprising:
   (1) a container defined by one or more side walls and a base;
   (2) a tube of a flexible material divided by dividing walls of a flexible material into an array of compartments running the length of the tube, the compartments being arranged in rows and columns so that the tube divided by dividing walls has a honeycomb structure, with a first end of the tube on the base of the container and a second end of the tube above the first end of the tube;
   (3) first flow means at or near the first end of the tube, and either in the dividing walls between either the first and second rows and between the third and fourth rows and between each succeeding pairs of rows, or in the dividing walls between the second and third rows and between the fourth and fifth rows and between each succeeding pairs of rows;
   (4) second flow means at or near the second end of the tube, and either in the dividing walls between the second and third rows and between the fourth and fifth rows and between each succeeding pairs of rows, or in the dividing walls between the first and second rows and between the third and fourth rows and between each succeeding pairs of rows, so that the first flow means and the second flow means alternate;
   (5) a fluid inlet into the first row of compartments; and
   (6) a fluid outlet from the last row of compartments; so that fluid introduced through the fluid inlet flows either up or down the compartments in the first row, through the first or second flow means between the first and second rows, and then down or up the compartments in the second row, through the second or first flow means between the second and third rows, and so on until the fluid reaches the fluid outlet.

2. Apparatus according to claim 1 wherein the first flow means is provided by spacing the dividing walls between pair of rows from the base.

3. Apparatus according to claim 1 or claim 2 wherein the second flow means is provided by extending the dividing walls between a pair of rows above the dividing walls of adjacent rows.

4. Apparatus according to claim 1 wherein each first flow means comprises an aperture in a dividing wall between a pair of rows.

5. Apparatus according to claim 1 wherein each second flow means comprises an aperture in a dividing wall between a pair of rows.

6. Apparatus according to claim 4 or claim 5 wherein apertures are provided in each of the compartments in each of the rows.

7. Apparatus according to claim 1 wherein the tube is supported in the container by a series of flexible strings or rigid stays located through rows and columns of compartments, each of the flexible strings or rigid stays being attached to a fixed object to support the tube with the first end of the tube on the base and the second end of the tube above the first end.

8. Apparatus according to claim 7 wherein a flexible string or a rigid stay is located in at least a row or a column of compartments at or near each of the edges of the tube.

9. Apparatus according to claim 1 wherein the cross-sectional size of the compartments reduces or increases from the compartments of the first row of compartments to the compartments of the last row of the compartments.

10. Apparatus according to claim 1 wherein one or more of the compartments includes a baffle or baffles to direct the flow of the fluid through the compartment.

11. Apparatus according to claim 1 wherein the base is located above a space, the space having an outlet, the base being adapted to be moved to allow any material in the compartments of the tube to move into the space from where the material may be removed via the outlet.

12. Apparatus according to claim 1 wherein the base under each compartment is funnel shaped, each funnel shape having a central hole through which material may be removed or through which a fluid may be forced into the compartment concerned.

13. Apparatus according to claim 1 wherein the tube and the dividing walls are made from a plastics material.

14. Apparatus according to claim 1 wherein each compartment has a square-cross section.

15. Apparatus according to claim 1 wherein one or more of the compartments are filled with a filler material.

16. Apparatus according to claim 1 which includes one or more additional inlets into a compartment or into a row or column of compartments for the introduction of a gas, fluid or solid or to allow heat exchange to take place, while the fluid is circulating through the apparatus.

17. Apparatus according to claim 1 for use in the treatment of a liquid containing suspended solids to remove the solids therefrom.

18. Apparatus according to claim 1 for use in the treatment of water to purify the water.

19. Apparatus according to claim 1 for use in the chemical mixing of a liquid or a gas or a solid chemical into a bulk liquid.

20. Apparatus according to claim 1 for use as a methane digester.

21. Apparatus according to claim 1 for use in aquaculture.

22. A method for circulating a fluid from a first end to a second end of an apparatus, the apparatus comprising:

(1) a container defined by one or more side walls and a base:

(2) a tube of a flexible material divided by dividing walls of a flexible material into an array of compartments running the length of the tube, the compartments being arrange in rows and columns so that the tube divided by dividing walls has a honeycomb structure, the tube being located and secured in the container with a first end of the tube on the base of the container and a second end of the tube above the first end of the tube;

(3) first flow means at or near the first end of the tube, and either in the dividing walls between the first and second rows and between the third and fourth rows and between each succeeding pairs of rows, or in the dividing walls between the second and third rows and between the fourth and fifth rows and between each succeeding pairs of rows;

(4) second flow means at or near the second end of the tube, and either in the dividing walls between the second and third rows and between the fourth and fifth rows and between each succeeding pairs of rows, so that the first flow means and the second flow means alternate;

(5) a fluid into the first row of compartments; and (6) a fluid outlet from the last row of compartments; the method including the steps of introducing the fluid through the fluid inlet into the first row of compartments, and allowing the fluid to flow either up or down the compartments in the first row, through the first or second flow means between the first and second rows, and then down or up the compartments in the second row, through the second or first flow means between the second and third rows, and so on until the luid reaches the fluid outlet.

* * * * *